Sept. 8, 1953 H. R. L. LAMONT ET AL 2,651,759
WAVE SIGNAL TRANSLATING AND SEPARATION SYSTEM
Filed Sept. 11, 1947 2 Sheets-Sheet 1

INVENTOR.
HUGH RUSSELL LETHAM LAMONT
ROBERT GIBSON ROBERTSHAW
BY John A. Harvey
ATTORNEY

*INVENTOR.*
HUGH RUSSELL LETHAM LAMONT
ROBERT GIBSON ROBERTSHAW
*BY*
John A. Harvey
ATTORNEY Patented Sept. 8, 1953

2,651,759

UNITED STATES PATENT OFFICE 2,651,759

WAVE SIGNAL TRANSLATING AND SEPARATION SYSTEM

Hugh Russell Letham Lamont, North Wembley, and Robert Gibson Robertshaw, Bedford Park, England, assignors to The General Electric Company, Limited, London, England Application September 11, 1947, Serial No. 773,372
In Great Britain August 2, 1946

Section 1, Public Law 690, August 8, 1946
Patent expires August 2, 1966

7 Claims. (Cl. 333—6)

Figure 1:
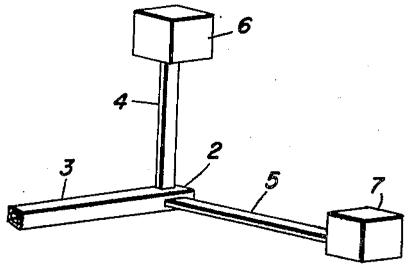

This invention relates to systems for signalling with electrical oscillations of very high frequency of the type wherein two contiguous stations are connected through a common wave-guide to a common channel for conveying signals to or from the stations. In this specification the term station is used only to denote apparatus which comprises either a transmitter or a receiver of signals and the invention is particularly, though not exclusively, concerned with duplex systems for radio-signalling wherein the two stations at each end of the link are a transmitter and a receiver connected through a common wave-guide to a common aerial.

The problem to which the invention is directed is that of facilitating the separation of the signals at the said common wave-guide, i. e. of substantially preventing signals intended for or emanating from one of the said two stations from reaching the other station; this is particularly important in the case of duplex radio-signalling wherein the relatively strong signals from the transmitter at either end of the link must be prevented from reaching and damaging the receiver at that end and the relatively weak received signals must not be undesirably absorbed in the transmitter.

It is already known in duplex signalling to arrange that the electrical signals have different polarizations and are separated in the common wave guide by virtue of their different polarizations.

The object of this invention is to provide a simple and efficient arrangement for effecting such separation.

According to the invention in a wave-signal translating and separating system wherein two contiguous stations are connected through a common wave guide of square cross section to a common signal-conveying channel, the common wave guide is effectively short-circuited at one end thereof and is coupled to the signal-conveying channel at the other end thereof. The signals associated with the stations are polarized in mutually perpendicular planes each parallel to sides of the common wave guide. Each of the above-mentioned stations is coupled to the common wave guide through a polarized filtering slot of substantially rectangular shape formed in the periphery of the common wave guide. Each of the slots has one pair of parallel sides substantially parallel to the longitudinal axis of the common wave guide and positioned in the periphery thereof at a distance from the above-mentioned one end thereof which is substantially an integral multiple of a quarter wave length of the waves translated therealong. These slots are individually responsive to different ones of the above-mentioned signals having different planes of polarization whereby each of these slots passes the waves of the polarization corresponding to the station coupled thereto but not the waves of the other polarization.

A slot may open directly into the station, the latter then being positioned against the common wave guide, or the station may be remote and coupled to the common wave guide through a coupling wave guide whose opening into the common wave guide constitutes the slot. In either case the common wave guide may be regarded as branching at the slot and the position of the slot, which will usually be rectangular, will depend on whether the branch is a series or a parallel branch for the waves adapted to pass through the slot; i. e. on whether the electrical vector for the waves is respectively parallel to or perpendicular to the plane of the branch.

These and other aspects of the invention will be further explained in describing the examples of the invention illustrated in the accompanying drawings, in which Fig. 1 indicates schematically in perspective an arrangement in accordance with the invention in which both stations are coupled to the common wave guide through coupling wave guides; and Figs. 2–6, inclusive, represent perspective details of arrangements for use when both stations are coupled to the common wave guide through coupling wave guides.

In Figure 1 there is represented a wave guide 3 effectively short-circuited at one end 2 and arranged to be coupled to a signal-conveying channel, for example, to a suitable antenna at the other end 1. The wave guide 3 is of square cross section, and thus is adapted to pass equally well oscillations polarized with their electric vectors mutually perpendicular to each other and each parallel to a side of the wave guide. A branch arm 4 couples the wave-guide 3 to one station 6, which may be for example a transmitter, and another branch arm 5 couples the wave-guide 3 to the other station 7, which may be for example a receiver. The wave-guides 4 and 5 are rectangular cross-section and are each adapted to pass only the oscillations whose electric vector is parallel to their short sides, thus effecting a separation of the oscillations.

The stations 6 and 7 may be both transmitters or both receivers or one may be a transmitter and the other a receiver, and each is adapted to receive, or transmit, waves of the appropriate polarisation.

Figure 2:
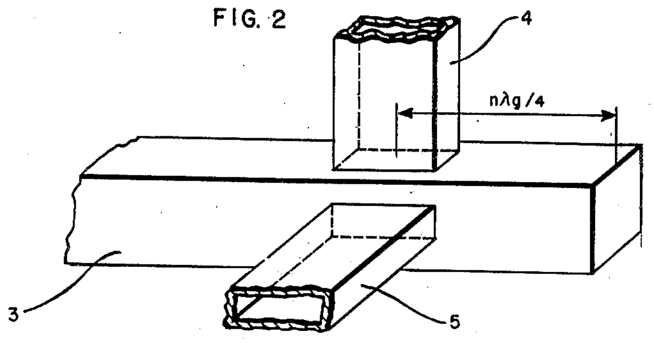

Figure 2 shows more clearly the nature of the branches shown in Figure 1; the coupling wave-guides 4, 5 are arranged so that both are parallel branches and the wave-guide 3 is therefore continued beyond the branching point for an equivalent distance $n\lambda_g/4$, where $n$ is an odd integer and $\lambda_g$ is the wave length of the oscillations in the wave-guide 3.

Figure 3:
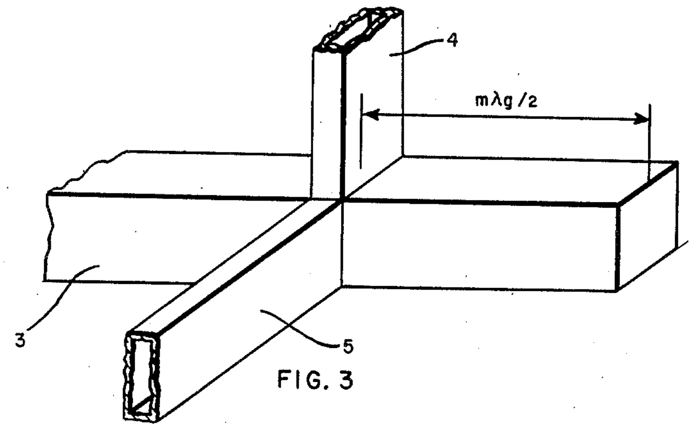

Figure 3 shows an alternative in which the arms 4, 5 are both arranged as series branches and the wave-guide 3 is now continued for an equivalent distance $m\lambda_g/2$ beyond the branching point, where $m$ is an integer.

Figure 4:
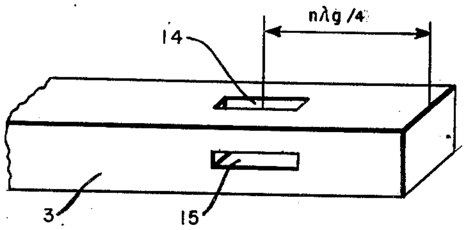
Figure 5:
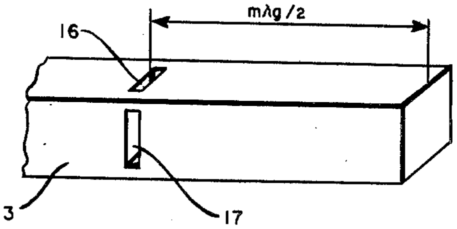

Figures 4 and 5 show arrangements similar to Figures 2 and 3 but in which the arms 4, 5 have been reduced to slots, 14, 15 in Figures 4 and 16, 17 in Figure 5, in the walls of the wave-guide 3; slots 14, 15 are effectively parallel branches and slots 16, 17 are effectively series branches; the two stations 6, 7, which may as aforesaid be a transmitter and receiver, abut directly against the walls of the wave-guide 3 but have not been shown in Figures 4 and 5 in order that the slots may be clearly seen.

Figure 6:
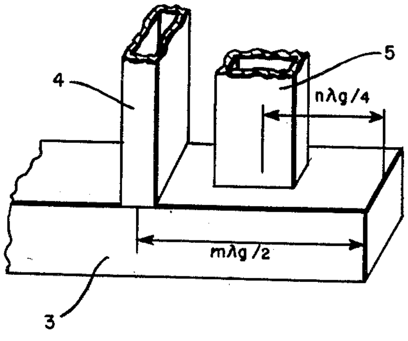

Figure 6 shows a further alternative arrangement to that of Figure 2 in which the two arms 4, 5 are arranged as series and parallel branches respectively; arm 4 is situated at an equivalent distance $m\lambda_g/2$ from the closed end of the wave-guide 3 and arm 5 is situated at an equivalent distance $n\lambda_g/4$.

It is preferable that, in a system according to the invention, the frequency of the waves of the one polarisation should be so nearly the same as the frequency of the waves of the other polarisation that they can both be transmitted efficiently along the common part of the wave-guide. But it is not necessary, or always desirable, that the two frequencies should be exactly the same. Thus, if they are not, in the case of duplex radio signalling the receiver at each end may be of the superheterodyne type, and the transmitter at the same end may be arranged to provide the local oscillations for the receiver.

We claim:

1. A wave-signal translating and separation system wherein two contiguous stations are connected through a common wave-guide of square cross-section to a common signal-conveying channel, said wave guide being effectively short-circuited, at one end thereof and arranged to be coupled to said signal-conveying channel at the other end thereof, wherein the signals associated with the stations are polarised in mutually perpendicular planes each parallel to sides of the said common wave-guide, and wherein each of said stations is coupled to said common wave-guide through a polarisation-filtering slot of substantially rectangular shape formed in the periphery of said common wave-guide, each of said slots having one pair of parallel sides substantially parallel to the longitudinal axis of said common wave guide and positioned in the periphery thereof at a distance from said one end thereof which is substantially an integral multiple of a quarter wave length of the waves translated therealong, said slots being individually responsive to different signals having said different planes of polarization whereby each of said slots translates the waves of the polarisation corresponding to that station, but not the waves of the other polarisation.

2. A wave-signal translating and separation system according to claim 1 wherein each station is coupled to the common wave-guide through a rectangular coupling wave-guide whose cross-section is the same as the corresponding polarisation-filtering slot in a side-wall of the common wave-guide.

3. A wave-signal translating and separation system according to claim 1 wherein at least one of the said stations abuts against a side-wall of the common wave-guide so that the corresponding slot opens directly into the station without the use of any coupling wave-guide.

4. A wave-signal translating and separation system according to claim 1 wherein the said common wave-guide of square cross-section is branched from rectangular polarisation-filtering slots in adjacent faces into two mutually perpendicular coupling wave-guides each of rectangular cross-section and each having the longer side of cross-section parallel to the length of the common wave-guide, one of said coupling wave-guides leading to one station and the other to the other station, wherein the incoming and outgoing signals are polarised with their electric vectors parallel to adjacent sides of the common square wave-guide and each parallel to the shorter side of the corresponding coupling wave-guide, and wherein the common square wave-guide is continued for an odd number of quarter-wave-lengths, measured in the guide, beyond the equivalent branching point, and is closed at the end of the continuation.

5. A wave-signal translating and separation system according to claim 1 wherein the said common wave-guide of square cross-section is branched from rectangular polarisation-filtering slots in adjacent faces into two mutually perpendicular coupling wave-guides each of rectangular cross-section and each having the shorter side of cross-section parallel to the length of the common square wave-guide, one of said coupling wave-guides leading to one station and the other to the other station, wherein the incoming and outgoing signals are polarised with their electric vectors parallel to adjacent sides of the common square wave-guide and each parallel to the longer side of the corresponding coupling wave-guide and wherein the common square wave-guide is continued for an integral number of half-wave-lengths, measured in the guide, beyond the equivalent branching point, and is closed at the end of the continuation.

6. A wave-signal translating and separation system according to claim 1 wherein the common wave-guide of square cross-section is closed at one end and is branched from the same side into two coupling wave-guides of rectangular cross-section each leading to one of said stations, wherein one coupling wave-guide is disposed with its shorter side parallel to the length of the square wave-guide and at a distance from the closed end which is effectively an integral number of half-wave-lengths measured along the guide, wherein the other coupling wave-guide is disposed with its shorter side perpendicular to the length of the common square wave-guide and at a distance from the closed end which is effectively an odd number of quarter-wave-lengths measured along the guide.

7. A wave-signal separation system wherein a transmitter and a receiver in proximate physical relationship are connected through a common wave-guide of square cross-section to a common signal-conveying channel wherein said transmitter and receiver signals are polarised in mutually perpendicular planes each parallel to sides of the said common wave-guide, and wherein the transmitter and receiver are each coupled to the common wave-guide through a polarisation-filtering slot of substantially rectangular shape formed in the periphery of the common wave-guide, each of said slots having one pair of parallel sides substantially parallel to the longitudinal axis of said common wave guide and positioned in the periphery thereof at a distance from said one end thereof which is substantially an integral multiple of a quarter wave length of the waves translated therealong, said slots being individually responsive to different signals having said different planes of polarization whereby each of said slots translates the waves of the appropriate one polarisation but not the other polarisation.

HUGH RUSSELL LETHAM LAMONT.
ROBERT GIBSON ROBERTSHAW.

References Cited in the file of this patent

UNITED STATES PATENTS

| Number | Name | Date |
|---|---|---|
| 2,129,712 | Southworth | Sept. 13, 1938 |
| 2,362,561 | Katzin | Apr. 14, 1944 |
| 2,438,119 | Fox | Mar. 23, 1948 |
| 2,445,896 | Tyrrell | July 27, 1948 |